(12) United States Patent
Uniyal

(10) Patent No.: US 12,287,703 B2
(45) Date of Patent: Apr. 29, 2025

(54) LOCALIZE INCIDENT RESOLUTION GENERATOR WITH RECONSTRUCTION

(71) Applicant: Bank of America Corporation, Charlotte, NC (US)

(72) Inventor: Rahul Uniyal, Uttarakhand (IN)

(73) Assignee: Bank of America Corporation, Charlotte, NC (US)

(*) Notice: Subject to any disclaimer, the term of this patent is extended or adjusted under 35 U.S.C. 154(b) by 52 days.

(21) Appl. No.: 18/221,530

(22) Filed: Jul. 13, 2023

(65) Prior Publication Data

US 2025/0021424 A1 Jan. 16, 2025

(51) Int. Cl.
| | |
|---|---|
| *G06F 11/00* | (2006.01) |
| *G06F 11/07* | (2006.01) |
| *G06F 11/22* | (2006.01) |
| *G06F 11/34* | (2006.01) |

(52) U.S. Cl.
CPC ...... *G06F 11/0793* (2013.01); *G06F 11/2273* (2013.01); *G06F 11/3457* (2013.01)

(58) Field of Classification Search
CPC . G06F 11/079; G06F 11/0793; G06F 11/3457
See application file for complete search history.

(56) References Cited

U.S. PATENT DOCUMENTS

| | | | |
|---|---|---|---|
| 8,370,362 B2 | 2/2013 | Szabo | |
| 10,977,293 B2 | 4/2021 | Cai et al. | |
| 11,113,653 B2 | 9/2021 | Ghosh et al. | |
| 2019/0213498 A1 | 7/2019 | Adjaoute | |
| 2019/0331902 A1 | 10/2019 | Ou et al. | |
| 2019/0349231 A1 | 11/2019 | Hill et al. | |
| 2019/0378073 A1 | 12/2019 | Lopez et al. | |
| 2020/0133756 A1* | 4/2020 | Sun | G06F 11/079 |
| 2020/0293946 A1 | 9/2020 | Sachan et al. | |
| 2021/0049489 A1* | 2/2021 | Sait M A | G06Q 10/063 |
| 2021/0133670 A1 | 5/2021 | Cella et al. | |

(Continued)

FOREIGN PATENT DOCUMENTS

| | | |
|---|---|---|
| AU | 2012233052 B2 | 7/2014 |
| AU | 2017421179 B2 | 10/2022 |

(Continued)

*Primary Examiner* — Philip Guyton
(74) *Attorney, Agent, or Firm* — Banner & Witcoff, Ltd.

(57) ABSTRACT

Localized incident resolution with reconstruction is disclosed. Fresh (i.e. non-generic) resolutions for IT incidents that include local user-specific attributes are generated. N-possible robotic process automation ("RPA") workflows are generated for applications at issue or cosine similar ones. IT incidents are reconstructed in safe environments. Modeling is performed to determine which of the N-possible RPA workflows have a sufficient probability of resolving the IT incident. Select RPA workflows are executed on the reconstructed IT incident in the safe environment to identify which workflow(s), if any, resolve the IT incident. RPA workflows demonstrated to work can be localized based on the user-specific attributes and deployed automatically. Detailed feedback and instructions specific to the user and the user's IT incident can be provided to identify what steps to take if a complete automated solution was not identified and successfully tested.

20 Claims, 5 Drawing Sheets

(56) References Cited

U.S. PATENT DOCUMENTS

| | | | |
|---|---|---|---|
| 2021/0186329 A1 | 6/2021 | Tran | |
| 2021/0303389 A1* | 9/2021 | Gadi | G06N 3/08 |
| 2021/0325301 A1 | 10/2021 | Porter et al. | |
| 2021/0357422 A1 | 11/2021 | Cella et al. | |
| 2021/0406106 A1* | 12/2021 | Moss | G06F 11/0706 |
| 2022/0058569 A1 | 2/2022 | Cella et al. | |
| 2023/0073644 A1* | 3/2023 | Thakkar | G06F 11/0781 |
| 2023/0141524 A1* | 5/2023 | Giles | G06F 8/71 |
| | | | 717/121 |
| 2023/0214317 A1* | 7/2023 | Jayaprasad | G06N 5/04 |
| | | | 714/26 |
| 2023/0376311 A1* | 11/2023 | Salem | G06F 11/3604 |
| 2024/0354229 A1* | 10/2024 | Fan | G06F 11/3668 |

FOREIGN PATENT DOCUMENTS

| | | |
|---|---|---|
| JP | 6531108 B2 | 6/2019 |
| JP | 7123795 B2 | 8/2022 |

\* cited by examiner

LOCALIZE INCIDENT RESOLUTION GENERATOR WITH RECONSTRUCTION

TECHNICAL FIELD

The present disclosure relates to data processing—artificial intelligence (AI) and, more particularly, to systems, methods, and apparatus for machine(s) that comprise parallel process(es) performed by a distributed architecture that learns to recognize and classify input data and then to, inter alia, identify and resolve information technology (IT) or other technology incidents with generative "localized" resolutions, match solutions based on masked data through situation reconstruction implemented in safe environments, generate N-number of modeled "robotic process automation" (RPA) workflows based on AI to attempt to resolve the problem, determine the best candidate solutions from the identified modeled workflows/instructions, reconstruct safe test environment(s) corresponding to the user's scenario in order to execute the modeled RPA workflows that are predicted to be highly likely to resolve the incident(s), and deploy successful RPA workflows to resolve the incident(s) in the user's actual local environment if the RPA workflows/instructions solved the problem in the reconstructed environment based on the modeled tests.

DESCRIPTION OF THE RELATED ART

An IT help desk is an example platform, team, or tool that enables businesses to organize customer communication and respond to incident queries. A help desk provides technical support to end users, troubleshoots customer and user issues, and/or guides them through specific tasks and actions.

The fundamental aim of an IT help desk is to provide swift and effective resolutions for IT incidents. It is a critical business resource that helps in reducing downtime associated with customer support services, increasing efficiency, and enhancing customer satisfaction.

Although traditional help desks and associated IT solution services try to resolve user requests efficiently, they are inherently inefficient and suffer from many problems.

Average resolution times are slow. First response times may be slow as well because they often require a human technician to provide an initial first response to a support ticket or respond to a query raised by a customer. First contact resolution rates are low (i.e., the first interaction with the customer) because of manual investigations and research by human technicians. The slower the FCRR, the worse the customer experience.

Current automated systems that attempt to identify resolution(s) for IT incidents usually provide information regarding historical resolutions. However, most of the time, the information is very cryptic and pertains specifically to the prior incident that matched the search query and has not been adapted whatsoever to the problem or situation presented by the current IT incident.

Further, current automated systems attempt to store substantially all information regarding incidents in the base models themselves. Much of this information (prior IP address, machine name, database info, network architecture, local variables, etc.) is inapplicable for "fresh" customized resolutions and therefore is irrelevant. This dramatically increases storage requirements and substantially requires ever-increasing processing times because of the quantity of useless data to parse. A similar example is ChatGPT wherein everything is stored in an extraordinarily large base model and is not even updated for new information.

This is extremely problematic. Most users need customized information or a localized solution to quickly, and preferably, automatically resolve an incident. Generalized information devoid of specific IT incident information (e.g., machine name/identifier, database information, IP address(es), environment variables, temporal features, etc.) are always different for any given IT incident. Providing generic information with an expectation that the user will solve the problem themselves usually is unrealistic, extremely frustrating for users, and ineffective.

Consequently, simply searching an existing database, whether by the user or someone at a help desk, is very problematic and ineffective. Hence there is a long felt and unsatisfied need to provide dramatically improved, real-time, AI/RPA modeled solutions based on a "retrieval" approach and cosine similarity analysis/matching wherein the potential solutions can be tested in a safe "reconstructed" environment in order to determine if there is a solution that can be automatically deployed in accordance with local user-specific attributes or alternative help that can be provided. And the machine(s) and processes need to be able to grow, learn, and adapt without increasing processing time and consuming tremendous space as time progresses.

SUMMARY OF THE INVENTION

In accordance with one or more arrangements of the non-limiting sample disclosures contained herein, solutions are provided to address one or more of the shortcomings in the field of data processing and artificial intelligence (AI) for IT incident resolution by, inter alia: (a) generating "fresh" (i.e., non-generic and customized) resolutions for IT incidents that include local user-specific attributes (e.g., machine numbers, IP addresses, database identifier(s), drive mappings, temporal features, the date/time of the incident, computer name, and/or other variables that might affect or be relevant to the IT incident using retrieval transformers (e.g., large language model (LLM) T5, Code T5, etc.); (b) reconstruct the incident in a safe environment (analogous to crime scene reconstructions in forensic science); (c) generate N-possible robotic process automation ("RPA") workflows even if not present currently for an application at issue, (d) reconstruct the user's IT incident in a safe environment (e.g., virtual machine and/or sandbox, etc.), (e) determine which of the N-possible RPA workflows have a sufficient probability of resolving the IT incident, (f) execute the N-possible RPA workflows on the reconstructed IT incident in the safe environment to identify which workflow(s), if any, resolve the IT incident, (g) deploy automatically an RPA workflow that was proven to work in the safe environment (e.g., cloud, virtual machine, and/or sandbox), and/or (h) provided detailed feedback and instructions specific to the user and the user's IT incident identifying what steps to take if a complete automated solution was not identified and successfully tested.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, generative localize resolutions are provided. By using retrieval transformer entities, a fresh localized incident resolution with respect to the queried incident can be generated. Using this approach, not only a fresh resolution can be generated for newer kinds of incidents, but also automated prediction times will be optimized by virtue of a retrieval approach.

In some arrangements, match solutions may be provided through reconstruction. Using environment and solution attributes, decoder(s) can generate RPA workflow(s) that can be executed in safe test environments. This can be performed in a sequential manner until a resolution match threshold is reached.

In some arrangements, a precise RPA workflow is utilized in which a number of results can be changed dynamically using a different threshold ($\tau$). This will provide high precision (reduced false positives) for RPA workflow and generated incidents. These localized results combined with the user's specific IT situation and variables will generate highly accurate RPA workflows.

In some arrangements, LLM T5, CodeT5, map/generate, refrained function, and retrieval transformers (including both encoders and decoders) for prediction patterns and algorithms may be used.

In some arrangements, technology stack(s) such as Python 3.9, Pytorch, and RPA tools may be used.

In some arrangements, a process for localized incident resolution with reconstruction can comprising the steps of: receiving, by a resolution generator (RG), an IT incident with local user-specific attributes for a first application; determining, by the RG based on a cosine match, whether a first existing solution exists for the IT incident for the first application and, if so: mapping, by the RG, the first existing solution based on the local user-specific attributes for the first application; and deploying, by the RG in real-time, the first existing solution based on the local user-specific attributes. If the first existing solution did not exist, steps including the following may be performed: reconstructing, by the RG based on the IT incident, a reconstructed incident in a safe environment; generating, by robotic process automation (RPA) in the RG for the reconstructed incident, RPA workflows that are non-generic resolutions incorporating said local user-specific attributes; analyzing, the RPA workflows by the RG, to identify artificial intelligence (AI) solutions that exceed a likelihood of success threshold; testing, by the RG in the safe environment, the AI solutions on the reconstructed IT incident; and selecting, by the RG, a top resolution based on the AI solutions that were tested. If the top resolution solved the reconstructed incident, then the following steps can be performed: localizing, by the RG, the top resolution with the local user-specific attributes; and deploying, by the RG in real-time, the top resolution to resolve the incident. Otherwise, if the top resolution did not solve the reconstructed incident, the steps to be performed can include localizing, by the RG, the top resolution into a partial solution with the local user-specific attributes; and providing, by the RG in real-time, information regarding the partial solution to help identify what workflow steps may help resolve the IT incident.

In some arrangements, the RG selects the top resolution and may use a refrained function.

In some arrangements, the localizing performed by the RG is implemented using a retrieval transformer.

In some arrangements, a decoder in the RG is used to generate the RPA workflows based on environment attributes.

In some arrangements, the likelihood of success threshold is dynamically changed based on historical data to reduce false positives and provide higher precision. Additionally and/or alternatively, the threshold may be dynamically adjusted based on current system demands in order to ensure optimum resolution processing time even under heavy system loads and provide even more precision when system demands are not as heavy.

In some arrangements, the information provided by the RG in real-time identifies what steps to take if a complete automated solution was not located and successfully tested.

In some arrangements, additional steps may be performed in the first existing solution did not exist, such as: determining, by the RG based on a cosine similarity between the first application and a second application exceeding a cosine threshold, whether a second existing solution exists for the IT incident and, if so: localizing, by the RG, the second existing solution based on the local user-specific attributes for the first application; and deploying, by the RG in real-time, the second existing solution based on the local user-specific attributes.

In some arrangements, if neither the first existing solution exists nor the second existing solution exists, the RPA workflows are generated for both the first application and the second application.

In some arrangements, the top resolution can be transformed to be applicable to the first application instead of the second application or visa versa depending on which RPA workflows proved to be optimum.

In some arrangements, the local user-specific attributes contain environment attributes.

In some arrangements, the safe environment can be implemented in a cloud, virtual machine, sand box, or the like.

In some arrangements, the retrieval transformer is implemented using a T5 text-to-text transformer large language model (LLM).

In some arrangements, the retrieval transformer is unified text-to-text transformer.

In some arrangements, the LLMs and their generative AI implementations can take written or spoken words and deliver specific answers backed-up by the inventive machine's data. It can summarize or transform the incident to allow the system to immediately dig into critical data.

In some arrangements, a process for localized incident resolution with reconstruction comprising the steps of: receiving, by a resolution generator (RG), an IT incident with local user-specific attributes for a first application; determining, by the RG based on a cosine match, whether a first existing solution exists for the IT incident for the first application and, if so: mapping, by the RG using a retrieval transformer, the first existing solution based on the local user-specific attributes for the first application; and deploying, by the RG in real-time, the first existing solution based on the local user-specific attributes. If the first existing solution did not exist, the following steps may be performed: determining, by the RG based on whether a cosine similarity between the first application and a second application exceeds a cosine threshold, whether a second existing solution exists for the IT incident and, if so: localizing, by the RG using the retrieval transformer, the second existing solution based on the local user-specific attributes for the first application; and deploying, by the RG in real-time, the second existing solution based on the local user-specific attributes. If neither the first existing solution nor the second existing solution exist, steps such as the following may be performed: reconstructing, by the RG based on the IT incident, a reconstructed incident in a safe environment; and generating, by robotic process automation (RPA) in the RG for the reconstructed incident, RPA workflows that are non-generic resolutions for both the first application and the second application, said RPA workflows incorporating said local user-specific attributes; analyzing, the RPA workflows by a decoder in the RG, to identify artificial intelligence (AI) solutions that exceed a likelihood of success threshold based on environment attributes in the local user-specific attributes; testing, by the RG in the safe environment, the AI solutions on the reconstructed IT incident; and selecting, by the RG using a refrained function, a top resolution based on the AI solutions that were tested. If the top resolution corresponds to the first application and solved the reconstructed incident, steps may be performed for localizing, by the RG using the retrieval transformer, the top resolution with the local user-specific attributes; and deploying, by the RG in real-time, the top resolution to resolve the incident. If the top resolution corresponds to the second application and solved the reconstructed incident, steps may be performed for localizing, by the RG using the retrieval transformer with the local user-specific attributes, the top resolution to correspond to the first application instead of the second application; and deploying, by the RG in real-time, the top resolution to resolve the incident. If the top resolution did not solve the reconstructed incident, steps can be performed for localizing, by the RG, the top resolution into a partial solution with the local user-specific attributes; and providing, by the RG in real-time, information regarding the partial solution to help identify what workflow steps may help resolve the IT incident.

In some arrangements, the likelihood of success threshold is dynamically changed based on historical data to reduce false positives and provide higher precision.

In some arrangements, the retrieval transformer is implemented using a T5 text-to-text transformer large language model (LLM).

In some arrangements, the retrieval transformer is a unified text-to-text transformer.

In some arrangements, one or more various steps or processes disclosed herein can be implemented in whole or in part as computer-executable instructions (or as computer modules or in other computer constructs) stored on computer-readable media. Functionality and steps can be performed on a machine or distributed across a plurality of machines that are in communication with one another.

In some arrangements, a real-time process for localized incident resolution with reconstruction can comprise the steps of: providing a plurality of incidents to a data lake storage containing a plurality of databases; providing, by the data lake storage to a generative model PLM, incident information, said generative model PLM including: a T5 PLM with a plurality of T5 encoders and T5 decoders, an autogenerative control test LLM with an LLM encoder and an LLM decoder, and a retrieval transformer with a retrieval encoder and a retrieval decoder. The process can also perform steps of: retrieving, by the autogenerative control test LLM from the data lake storage, control conditions for the incident; retrieving, by the retrieval transformer, incident information from the data lake storage; receiving, by the T5 encoders, an incident description and an incident resolution; transmitting, by the T5 decoders to a reconstructed test in a safe environment, environment attributes and resolution attributes; determining, by the reconstructed test, whether an existing solution exists and transmitting said existing solution to a CodeT5 PLM; generating, in the reconstructed test, potential RPA workflows to resolve the incident; selecting, from the reconstructed test, a top-resolution RPA workflow based on a likelihood of success threshold and transmitting said top-resolution RPA workflow to the CodeT5 PLM; mapping, by the CodeT5 PLM, the existing solution to resolve the incident and providing the existing solution to a refrained function; generating, by the CodeT5 PLM, the top-resolution RPA workflow to resolve the incident and providing the top-resolution RPA workflow to the refrained function; and determining, by the refrained function, whether to deploy the existing solution or the top-resolution RPA workflow, or to provide a localized resolution in text format for a manual solution, or to provide a message that no solution information is available.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1A:
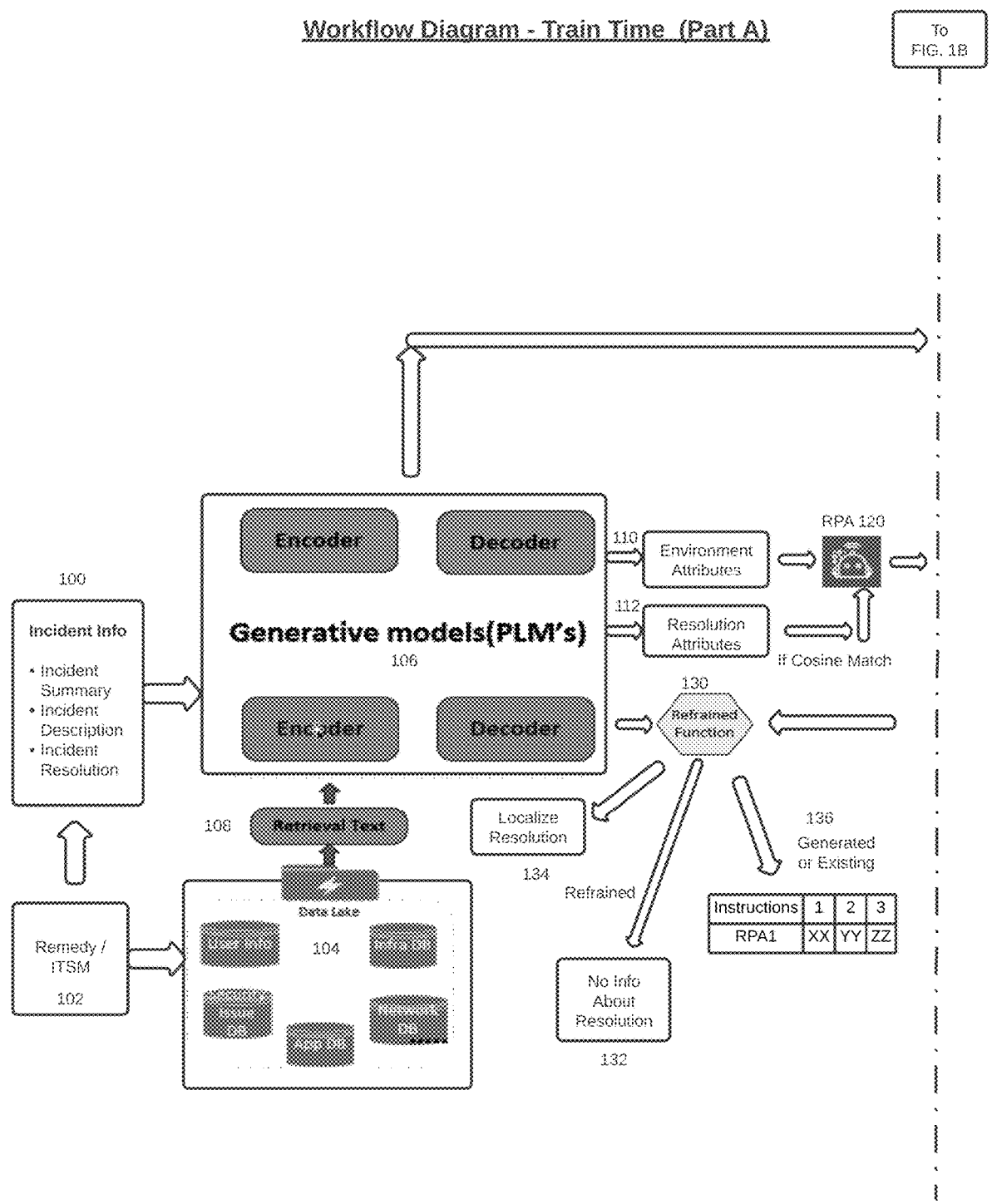
FIG. 1A depicts a first portion of a functional, workflow diagram showing sample interactions, interfaces, steps, functions, and components for a "train time" model in accordance with one or more aspects of this disclosure.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, portals (internal or external), servers, smart devices, streaming servers, tablets, web servers, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alerts, applications, application program interfaces (APIs), artificial intelligence, approvals, asymmetric encryption (including public/private keys), attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs), web servers, web sites, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

Figure 1B:
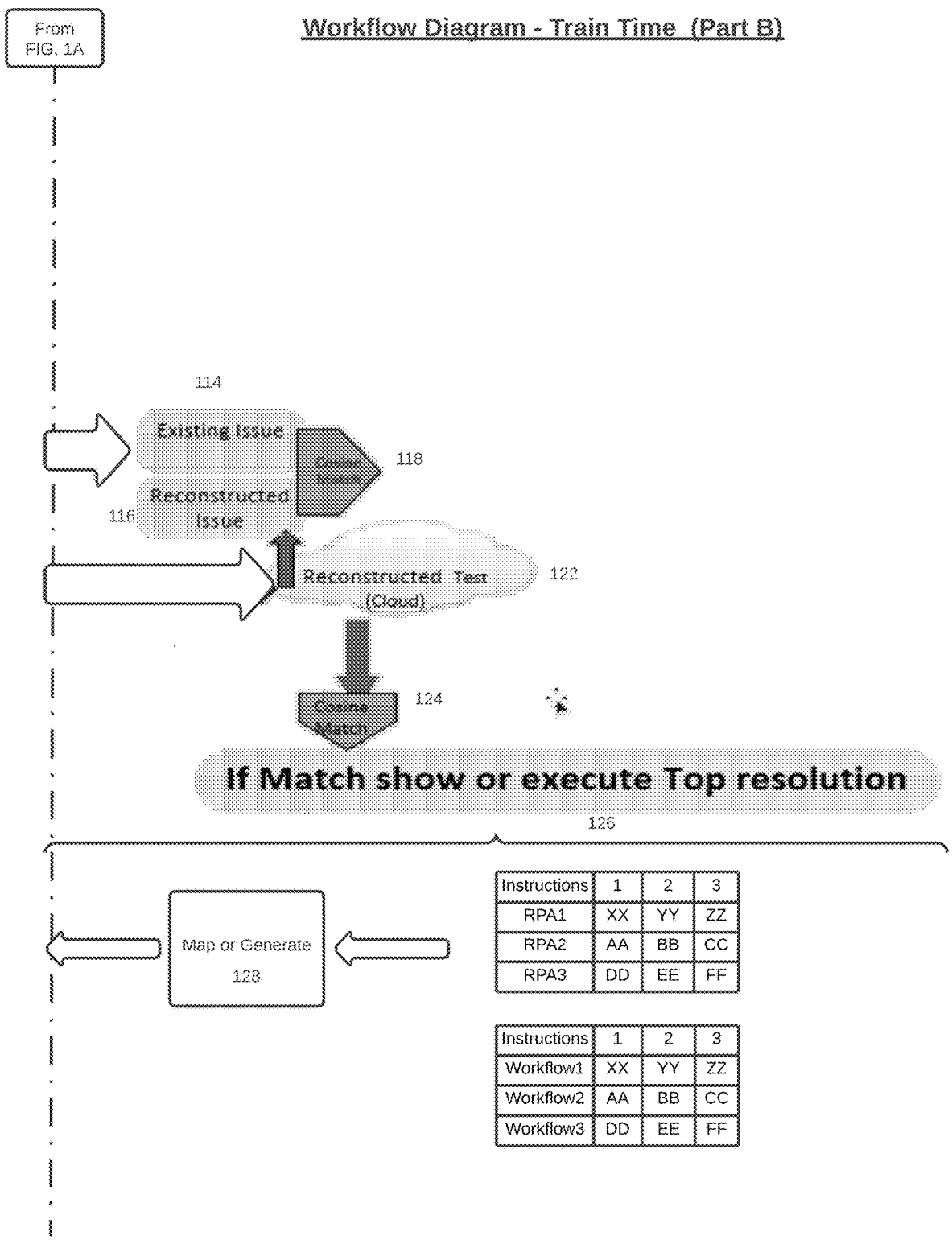
FIG. 1B depicts the second portion of the functional, workflow diagram showing sample interactions, interfaces, steps, functions, and components for a "train time" model in accordance with one or more aspects of this disclosure.

By way of non-limiting disclosure, FIGS. 1A and 1B depict first and second portions of a functional, workflow diagram showing sample interactions, interfaces, steps, functions, and components for a "train time" model in accordance with one or more aspects of this disclosure.

In the training time model, incident information 100 can include an incident summary, incident description, incident resolution, etc. Remedies and IT Service Management (ITSM) 102 can be used to manage the end-to-end delivery of IT services to customers. This includes all the processes and activities to design, create, deliver, and support IT services. This can be utilized in conjunction with a data lake or similar storage system 104 that may include, for example, databases for user info, security issues, applications, network information, infrastructure, etc. for various entities.

Incident info 100 can be passed to one or more retrieval transformers 106, which can be implementing by generative models with pretrained language models (PLMs) and natural language processing. These models combine the power of transformers, transfer learning, and self-supervised learning (or other types of machine learning if desired).

There are two parts for every transformer. One part is the encoder that will be encoding information received into a desired format and the decoder will be able to generate information for the RPA workflow to be used in the test environment. This can be the typical setup and utilize machine learning, especially natural language processing. A sequential execution of RPA instructions may be performed based on matching model thresholds.

To provide a more general illustration, a transformer will typically only carry out a limited and consistent number of steps, the value of which can be determined empirically. It is possible for it to apply a self-attention mechanism at each stage of the process. This mechanism directly models relationships between all of the words in a sentence, regardless of where those words are located in the sentence. The transformer has the capability of comparing a given word to every other word in the sentence in order to compute the subsequent representation for that word. As a consequence of these comparisons, an attention score has been calculated for every other word in the sentence. The attention scores are used to determine the relative weight that each of the other words should have in the subsequent representation of the word. When computing a new representation for the word in another sentence or context, this method of disambiguating words within a sentence or context can earn a high attention score. The attention scores can then be used as weights for a weighted average of all the representations of all the words. This weighted average of all the representations of all the words can then be used to generate a new representation for the word that reflects the appropriate context and meaning of the word.

Encoders for transformers take inputs and produce representations of those inputs. The output is then constructed by a decoder, which works word by word while consulting the representation that was produced by the encoder. The Transformer begins its work by producing initial representations, also known as embeddings, for each individual word. It does this by aggregating information from all of the other words, producing a new representation for each word that is informed by the overall context. This is done by using self-attention. This step is then repeated a number of times in parallel for each of the words, ultimately leading to the production of new representations in sequence. The decoder functions in a comparable manner, but it produces one word at a time, reading from left to right. It pays attention not only to the other words that were generated before it, but also to the representations that are produced as a conclusion by the encoder.

When processing or translating a particular word, transformers make it possible to visually inspect what other parts of a sentence are being attended to; as a result, one can gain insights into how information moves through the process. This helps in situations that can be challenging for machine translation systems, such as coreference resolution, for example. Transformers' operation and potential applications in the context of this disclosure are something that experts in the field are aware of and can explain in detail.

The retrieval transformer 106 can fetch retrieval text 108 in real-time from the data lake storage 104 for all of the information needed for the training. This enables the retrieval transformer to pass environment attributes 110 and resolution attributes 112.

An encoder in the retrieval transformer 106 can utilize information to determine whether the incident is an existing issue 114 or an issue to be reconstructed 116 based on a cosine similarity analysis or match 118.

RPA 120 can utilize the environment attributes 110 and/or resolution attributes 112 to perform the cosine similarity analysis for the reconstructed test 122. If there is a cosine match 124, the top resolution 126 can be selected and applied.

In particular, the top resolution 126 can be retrieved and mapped or generated 128 for the current incident and passed to a refrained function 130. This model allows the function 130 to tell whatever it knows such as, it does not have information about a resolution 132, an exact match was found and has been mapped/localized to solve the incident 134, or the incident has been reconstructed and a fresh solution has been generated 136.

Figure 2A:
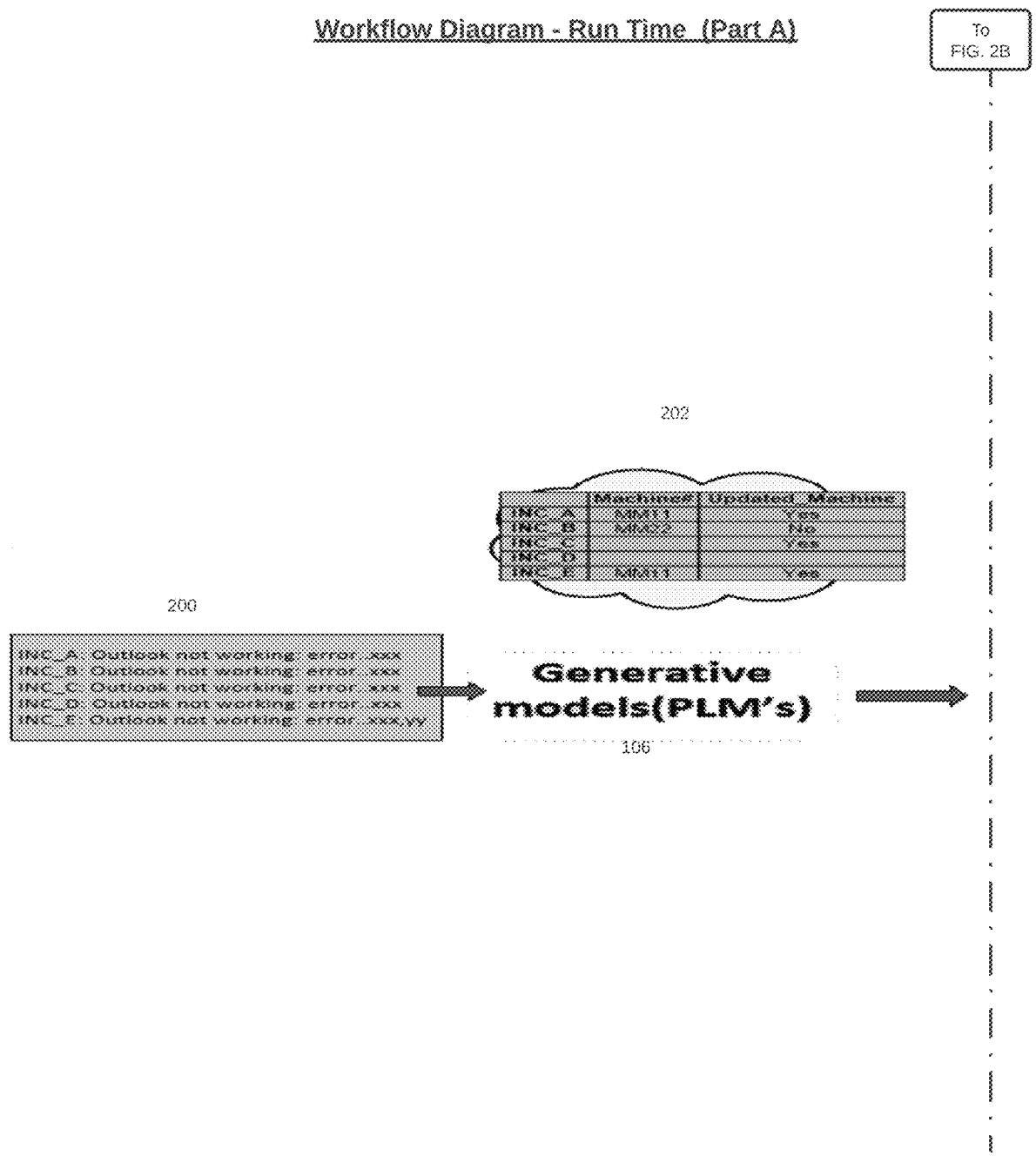
FIG. 2A depicts a first portion of a functional, workflow diagram showing sample interactions, interfaces, steps, functions, and components for a "run time" process in accordance with one or more aspects of this disclosure.
Figure 2B:
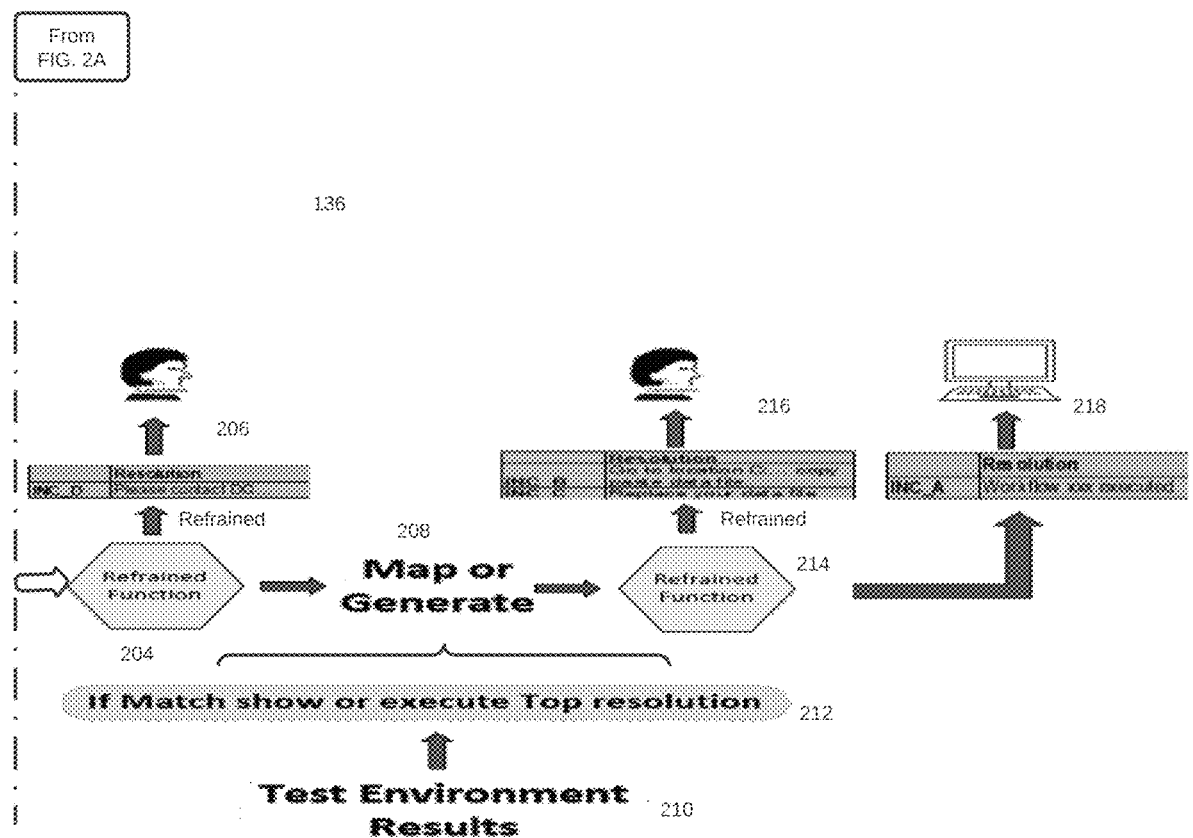
FIG. 2B depicts the second portion of the functional, workflow diagram showing sample interactions, interfaces, steps, functions, and components for a "run time" process in accordance with one or more aspects of this disclosure.

By way of non-limiting disclosure, FIGS. 2A and 2B depict first and second portions of a functional, workflow diagram showing sample interactions, interfaces, steps, functions, and components for a "run time" process in accordance with one or more aspects of this disclosure.

After the model has been trained as in FIGS. 1A-1B, the testing model may be implemented. Incoming incidents 200 such as various Outlook errors INC_A, INC_B, INC_C, INC_D, INC_E, etc. may be provided as input to the generative models (PLMs) 106. The incident inputs may be from different users, different applications, etc. and may occur concurrently or over a period of time.

Each incident may have its own machine number and characteristics, such as whether the machine has updated drivers, applications, patches, etc. or other pertinent status flags. This information 202 may already be contained in the data lake store 104 and can be retrieved for use in the system. It is relevant, for example, because a particular solution may be applicable if the user has one version of a patch for an operating system, browser, application, driver, etc. as opposed to an updated patch for the operating system, browser, application, driver, etc. In the former situation, the user may be told to apply the updated patch and then implement the solution manually or resubmit for automatic application. Or, in the latter scenario, everything is configured such that an automatic resolution may be deployed in real-time.

Initially, the refrained function 204 will look at the incident based on the information 202 and often will determine that it does not have any of the information about machine or updated machine at issue. As a result, the refrained function will instruct the user to contact the email distribution group (DG) or other applicable team, department, help personnel, etc. regarding the applicable incident, for example, INC_D as in 206. Refrained functions as disclosed herein may be making decisions based on predefined or dynamically generated thresholds to determine what is possible and/or optimum.

However, if an existing solution has been located or a sufficiently similar one has been identified by cosine similarity, an existing solution may be mapped based on local user-applicable attributes or a fresh resolution can be generated and tested in a safe environment as in 208 and provided in the test environment results 210.

If there is a match is identified the solution can be mapped or the top resolution from the tests performed in the test environment can be executed automatically in 212.

In refrained function 214, a determination can be made that the proposed reconstructed solution failed in INC_B and INC_C because updated information about the machines themselves is unknown. Hence, the workflow cannot be executed in 216. Consequently, the machine refrained from generating the automated solution, but it has provided resolution such as, for INC_B, go to hard drive location C: and copy/paste the data file to solve the problem, and for INC_C, the user may be told to replace their data file.

In the last situation, the information is known, the RPA analysis was able to successfully identify a solution, and therefore the solution workflow may be executed automatically in real-time to resolve incident INC_A in 218.

The refrained function essentially functions to determine how accurate the solution is in order to determine whether the accuracy is sufficient to provide information 206, partial resolution 216, or an automated resolution 218.

Figure 3:
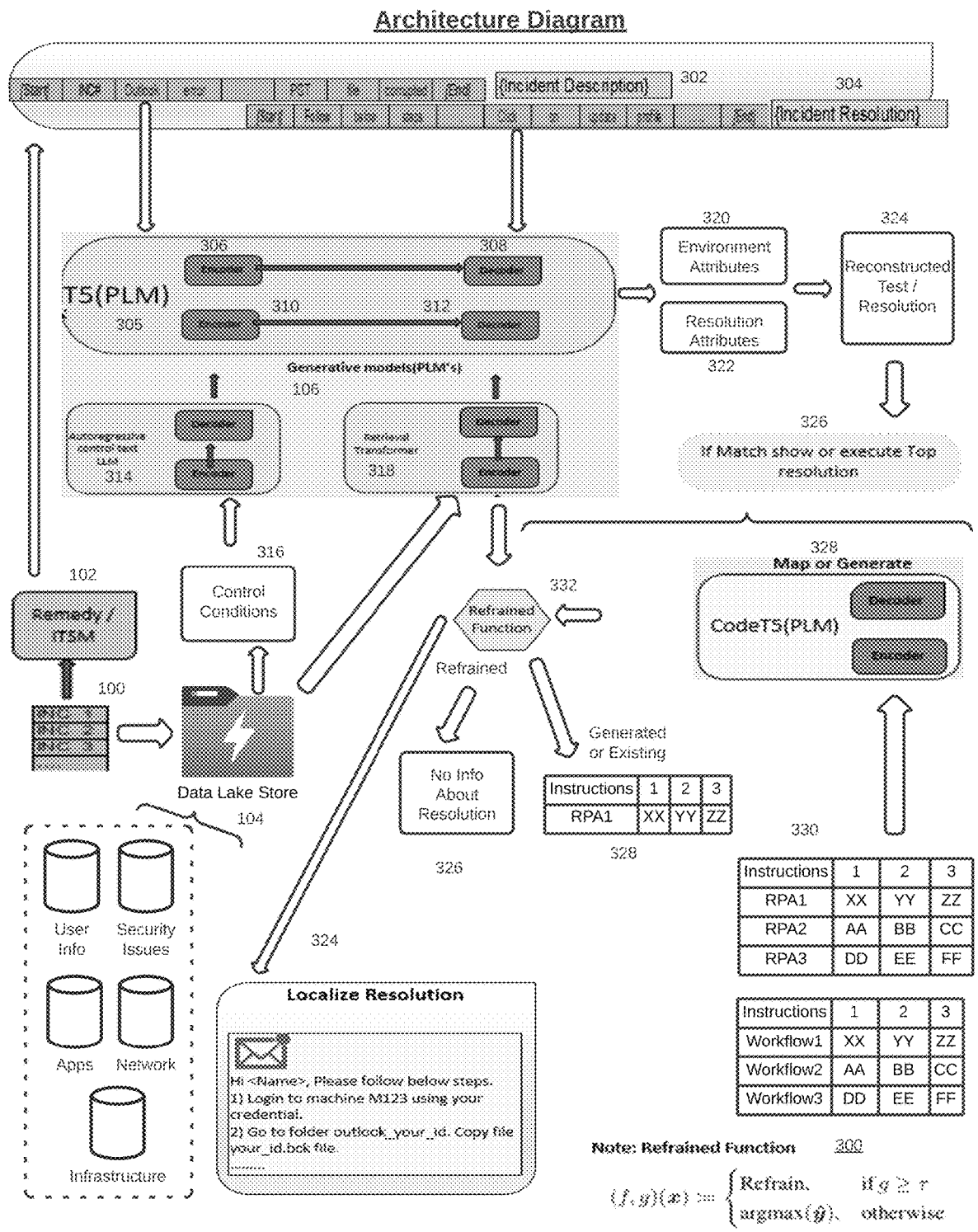
FIG. 3 depicts a functional architectural diagram in accordance with one or more aspects of this disclosure.

By way of non-limiting disclosure, FIG. 3 depicts a functional architectural diagram in accordance with one or more aspects of this disclosure. For reference, sample refrained function(s) referenced herein are defined and depicted in FIG. 3 at 300. Decisions may be made based on the refrained function depending on whether the variable being analyzed satisfies a particular threshold (e.g., represented as Greek letter tau).

An input description 302 may include various fields in various frames from a "start" frame, one or more fields or frames describing the incident, and a corresponding "end" frame. In this example, the incident could be that there was an Outlook error, and the PST file was corrupted.

An existing solution may already be known for the particular incident 302 known historically to solve the problem, and that may be spelled out by an incident resolution 304 that similarly has a "start" frame, one or more fields or frames spelling out the solution, and a corresponding "end" frame.

The incident description 302 may be provided to a first encoder 306 T5 PLM (which is publicly available) 305 and the incident resolution 304 in the first decoder 308 in the T5 PLM 305, which are part of the generative model PLMs 106. Based on the incident description, the T5 PLM 305 will be able to predict the incident resolution 304.

Multiple layers of T5 PLMs may be used, thereby utilizing additional encoders 310 and 312, in order to provide an even higher level of prediction and generational accuracy.

The generative model PLMs 106 are referred herein as generative because it will be able to generate new wordings, new sentences, new paragraphs, and a new resolution for the incident.

Incidents and remedy ITSM 100/102 repositories, queues, and/or data stores are coupled to the data lake storage 104.

An autoregressive control text LLM 314 will be able to fetch control conditions 316 from the data lake storage 104 and a retrieval transformer 318 would similarly be able to retrieve any applicable information from the appropriate database(s) in the data lake system 104 that are relevant to the incident. Processed information is then passed by the autoregressive control text LLM 314 and the retrieval transformer 318 to the T5 PLM 305.

The T5 PLM 305 will pass environment attributes 320 regarding the entities and the resolution attributes 322 to the reconstruction in the safe test environment 324. Processing can then occur to determine whether an exact match exists or RPA workflows can be generated and tested to determine the likelihood of success 326. Exact matches can then be mapped or the top resolution (from the possible scenarios 330) that worked in the test environment can be generated in a CodeT5 (PLM) 328.

For generated or existing successful solutions are identified and tested, the RPA workflows/instructions are executed in 328. Otherwise, the refrained function 332 will indicate that no information about the resolution was available 326, or otherwise provide detailed instructions for a localized resolution as in 324.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A computer-implemented process for localized incident resolution with reconstruction comprising the steps of:
   receiving, by a resolution generator (RG) on a processor, an IT incident with local user-specific attributes for a first application;
   determining, by the processor of the RG based on a cosine match, whether a first existing solution exists for the IT incident for the first application and, if so:
      mapping, by the processor of the RG, the first existing solution based on the local user-specific attributes for the first application;
      deploying, by the processor of the RG in real-time, the first existing solution based on the local user-specific attributes;
   if the first existing solution did not exist:
      reconstructing, by the processor of the RG based on the IT incident, a reconstructed incident in a safe environment;
      generating, by robotic process automation (RPA) executed by the processor of the RG for the reconstructed incident, RPA workflows that are non-generic resolutions incorporating said local user-specific attributes;
      analyzing, by the processor of the RG, the RPA workflows to identify artificial intelligence (AI) solutions that exceed a likelihood of success threshold;
      testing, by the processor of the RG in the safe environment, the AI solutions on the reconstructed IT incident;
      selecting, by the processor of the RG, a top resolution based on the AI solutions that were tested;
      if the top resolution solved the reconstructed incident:
         localizing, by the processor of the RG, the top resolution with the local user-specific attributes;
         deploying, by the processor of the RG in real-time, the top resolution to resolve the incident;
      if the top resolution did not solve the reconstructed incident:
         localizing, by the processor of the RG, the top resolution into a partial solution with the local user-specific attributes; and
         providing, by the processor of the RG in real-time, information regarding the partial solution to help identify what workflow steps may help resolve the IT incident;
   wherein the RG includes:
      an autogenerative control test large language model (LLM) with an LLM encoder and an LLM decoder;
      a retrieval transformer with a retrieval encoder and a retrieval decoder; and
      a CodeT5 pretrained language model (PLM), and
   wherein the method is performed on a tangible, non-transitory computer-readable medium.

2. The process for localized incident resolution with reconstruction of claim 1 in which the RG selects the top resolution by using a refrained function.

3. The process for localized incident resolution with reconstruction of claim 2 in which the localizing performed by the RG is implemented using a retrieval transformer.

4. The process for localized incident resolution with reconstruction of claim 3 in which a decoder in the RG is used to generate the RPA workflows based on environment attributes.

5. The process for localized incident resolution with reconstruction of claim 4 in which the likelihood of success threshold is dynamically changed based on historical data to reduce false positives and provide higher precision.

6. The process for localized incident resolution with reconstruction of claim 5 wherein the information provided by the RG in real-time identifies what steps to take if a complete automated solution was not located and successfully tested.

7. The process for localized incident resolution with reconstruction of claim 6 further comprising the steps of:
determining, if the first existing solution did not exist, by the RG based on a cosine similarity between the first application and a second application exceeding a cosine threshold, whether a second existing solution exists for the IT incident and, if so:
localizing, by the RG, the second existing solution based on the local user-specific attributes for the first application; and
deploying, by the RG in real-time, the second existing solution based on the local user-specific attributes.

8. The process for localized incident resolution with reconstruction of claim 7 in which, if neither the first existing solution exists nor the second existing solution exists, the RPA workflows are generated for both the first application and the second application.

9. The process for localized incident resolution with reconstruction of claim 8 in which, if the top resolution solved the reconstructed incident, the top resolution is transformed to be applicable to the first application instead of the second application.

10. The process for localized incident resolution with reconstruction of claim 9 in which, if the top resolution did not solve the reconstructed incident, the top resolution is transformed to be applicable to the first application instead of the second application.

11. The process for localized incident resolution with reconstruction of claim 10 in which the local user-specific attributes contain environment attributes.

12. The process for localized incident resolution with reconstruction of claim 11 wherein the safe environment implemented in a cloud environment.

13. The process for localized incident resolution with reconstruction of claim 12 wherein the retrieval transformer is implemented using a T5 text-to-text transformer large language model (LLM).

14. The process for localized incident resolution with reconstruction of claim 12 wherein the retrieval transformer is unified text-to-text transformer.

15. A computer-implemented process for localized incident resolution with reconstruction comprising the steps of:
receiving, by a resolution generator (RG) on a processor, an incident with local user-specific attributes for a first application;
determining, by the processor of the RG based on a cosine match, whether a first existing solution exists for the incident for the first application and, if so:
mapping, by the processor of the RG using a retrieval transformer, the first existing solution based on the local user-specific attributes for the first application;
deploying, by the processor of the RG in real-time, the first existing solution based on the local user-specific attributes;
if the first existing solution did not exist:
determining, by the processor of the RG based on whether a cosine similarity between the first application and a second application exceeds a cosine threshold, whether a second existing solution exists for the incident and, if so:
localizing, by the processor of the RG using the retrieval transformer, the second existing solution based on the local user-specific attributes for the first application; and deploying, by the processor of the RG in real-time, the second existing solution based on the local user-specific attributes;
if neither the first existing solution nor the second existing solution exist:
reconstructing, by the processor of the RG based on the incident, a reconstructed incident in a safe environment;
generating, by robotic process automation (RPA) executed by the processor of the RG for the reconstructed incident, RPA workflows that are non-generic resolutions for both the first application and the second application, said RPA workflows incorporating said local user-specific attributes;
analyzing, by the processor of by a decoder in the RG, the RPA workflows to identify artificial intelligence (AI) solutions that exceed a likelihood of success threshold based on environment attributes in the local user-specific attributes;
testing, by the processor of the RG in the safe environment, the AI solutions on the reconstructed incident;
selecting, by the processor of the RG using a refrained function, a top resolution based on the AI solutions that were tested;
if the top resolution corresponds to the first application and solved the reconstructed incident:
localizing, by the processor of the RG using the retrieval transformer, the top resolution with the local user-specific attributes;
deploying, by the processor of the RG in real-time, the top resolution to resolve the incident;
if the top resolution corresponds to the second application and solved the reconstructed incident:
localizing, by the processor of the RG using the retrieval transformer with the local user-specific attributes, the top resolution to correspond to the first application instead of the second application;
deploying, by the processor of the RG in real-time, the top resolution to resolve the incident;
if the top resolution did not solve the reconstructed incident:
localizing, by the processor of the RG, the top resolution into a partial solution with the local user-specific attributes; and
providing, by the processor of the RG in real-time, information regarding the partial solution to help identify what workflow steps may help resolve the incident;
wherein the RG includes:
an autogenerative control test large language model (LLM) with an LLM encoder and an LLM decoder;
a retrieval transformer with a retrieval encoder and a retrieval decoder; and
a CodeT5 pretrained language model (PLM), and
wherein the method is performed on a tangible, non-transitory computer-readable medium.

16. The process for localized incident resolution with reconstruction of claim 15 in which the likelihood of success threshold is dynamically changed based on historical data to reduce false positives and provide higher precision.

17. The process for localized incident resolution with reconstruction of claim 16 wherein the safe environment implemented in a virtual machine, sandbox, or cloud environment.

18. The process for localized incident resolution with reconstruction of claim 17 wherein the retrieval transformer is implemented using a T5 text-to-text transformer large language model (LLM).

19. The process for localized incident resolution with reconstruction of claim 18 wherein the retrieval transformer is unified text-to-text transformer.

20. A real-time process for localized incident resolution with reconstruction comprising the steps of:
- providing a plurality of incidents to a data lake storage containing a plurality of databases;
- providing, by the data lake storage to a generative model PLM, incident information, said generative model PLM including:
  - a T5 PLM with a plurality of T5 encoders and T5 decoders,
  - an autogenerative control test LLM with an LLM encoder and an LLM decoder, and
  - a retrieval transformer with a retrieval encoder and a retrieval decoder;
- retrieving, by the autogenerative control test LLM from the data lake storage, control conditions for the incident;
- retrieving, by the retrieval transformer, incident information from the data lake storage;
- receiving, by the T5 encoders, an incident description and an incident resolution;
- transmitting, by the T5 decoders to a reconstructed test in a safe environment, environment attributes and resolution attributes;
- determining, by the reconstructed test, whether an existing solution exists and transmitting said existing solution to a CodeT5 PLM;
- generating, in the reconstructed test, potential RPA workflows to resolve the incident;
- selecting, from the reconstructed test, a top-resolution RPA workflow based on a likelihood of success threshold and transmitting said top-resolution RPA workflow to the CodeT5 PLM;
- mapping, by the CodeT5 PLM, the existing solution to resolve the incident and providing the existing solution to a refrained function;
- generating, by the CodeT5 PLM, the top-resolution RPA workflow to resolve the incident and providing the top-resolution RPA workflow to the refrained function;
- determining, by the refrained function, whether to deploy the existing solution or the top-resolution RPA workflow, or to provide a localized resolution in text format for a manual solution, or to provide a message that no solution information is available.

* * * * *